No. 782,209. PATENTED FEB. 7, 1905.
P. MOEWS.
EYEGLASSES.
APPLICATION FILED JUNE 13, 1904.
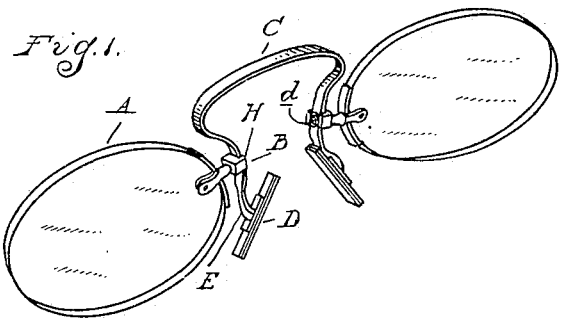
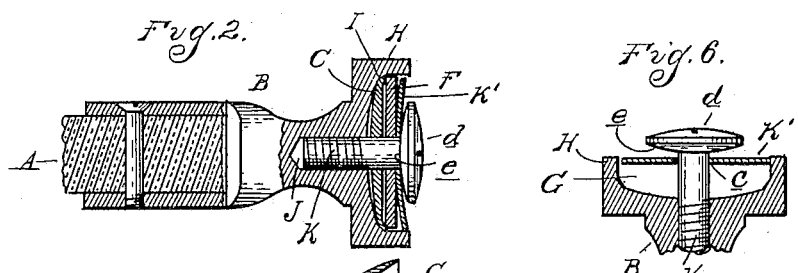
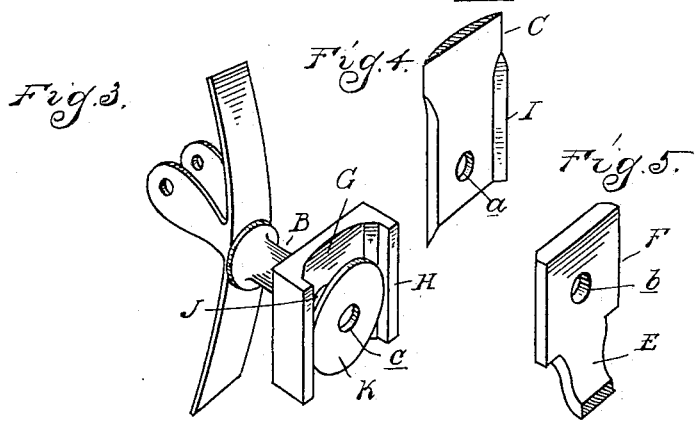
Inventor
Paul Moews No. 782,209.                                    Patented February 7, 1905.

UNITED STATES PATENT OFFICE.

PAUL MOEWS, OF DETROIT, MICHIGAN.

EYEGLASSES.

SPECIFICATION forming part of Letters Patent No. 782,209, dated February 7, 1905.

Application filed June 13, 1904. Serial No. 212,343.

*To all whom it may concern:*

Be it known that I, PAUL MOEWS, a citizen of the United States, residing at Detroit, in the county of Wayne and State of Michigan, have invented certain new and useful Improvements in Eyeglasses, of which the following is a specification, reference being had therein to the accompanying drawings.

The invention relates to new and useful improvements in eyeglasses or spectacles; and it consists in the particular construction of the post to which the bridge-piece and the nose-piece are clamped, said post having a socket to receive the extremities of the bridge and nose pieces and a washer attached to one side of the socket and projecting over the members to be clamped thereon, a screw passing through the washer and the bridge and nose pieces to hold the parts together.

The invention further consists in the particular construction, arrangements, and combination of parts, as more fully hereinafter described, and particularly pointed out in the claims.

In the drawings, Figure 1 is a perspective view of a pair of glasses embodying my invention. Fig. 2 is a vertical central section through the post, showing the parts in position and assembled as shown in Fig. 1. Fig. 3 is a detached perspective view of the post and attached parts, showing the washer attached to one of the side flanges of the socket. Fig. 4 is a detached perspective view of the extremity of the bridge. Fig. 5 is a detached perspective view of the extremity of the nose-guard; and Fig. 6 is a section similar to Fig. 2 through the upper portion of the post, showing the washer and screw in position.

A represents the lenses; B, the posts, which may be secured to the inner ends of the lenses in any suitable manner; C, the bridge-piece, and D the nose guards or clamps. The nose-guards are provided with the attached arms E, having a squared portion F, adapted to fit in the socket G between the flanges H at the outer end of the post. The extremities of the bridge-piece I preferably provide with the marginal flanges I, these extremities likewise fitting in the socket G beneath the squared portion F of the nose-guards. The outer end of the post has the socket G, as previously described, formed between the two vertical flanges H, and the post has a suitable screw-threaded aperture J to receive the clamping-screw K, which also passes through apertures *a* and *b* in the bridge-piece and the attaching member of the nose-guard.

The construction thus far described is the construction described in the claims in my prior patent, No. 760,008, dated May 17, 1904.

In the use of such a device as already described, notwithstanding the very efficient clamping action of the screw in connection with the secured portion F and the extremity of the bridge member C, having the flanges I thereon, I find that the screw is apt to become loose, and I have increased the efficiency of the clamping action of the screw and provided means for rendering it much less liable to loosen even under the very hardest kind of use, which is the subject of my present invention and which I will now describe.

K' is a washer which I secure at one edge to the inner edge of one of the flanges H. This may be secured, and I preferably do secure it, by soldering it, so that it becomes, in effect, an equivalent or complementary portion of the flanges, between which is formed the socket. The washer of course has the usual aperture *c* for the screw K to pass through. I also preferably shape the inner face of the head *d* of the screw, as shown in Fig. 2, to have a slightly-conical inner face, as shown at *e*. The parts being thus constructed, to assemble them the operator inserts the extremity of the bridge C in the bottom of the socket and then the squared portion F of the nose-piece above that, but beneath the washer K'. The screw K is then inserted and screwed tightly down, clamping all the parts together. The washer K' being a thin flexible washer and being rigidly attached to the flange H will be depressed upon the outer face of the squared portion F of the nose-piece, and the washer being held from rotation by its adjustment to the side of the socket member the parts are clamped tightly together, and the screw, bearing against a non-rotatable portion, bent down, as shown in Fig. 2, will not loosen under any ordinary usage and will hold the parts rigidly and firmly in place at all times.

What I claim as my invention is—

1. In an eyeglass-fitting, the combination with the post member provided with a channel-shaped head, of a thin flexible washer secured to the upper edge of one of the channel-walls and projecting laterally across the head, a marginally-flanged bridge member engaging the head, a nose-guard interposed between the washer and bridge member and engaging the flanges thereon, and a screw extending through said parts and into the post, substantially as described.

2. In an eyeglass, the combination with a post of vertical flanges on the sides of the head thereof, forming a socket between, of a thin, flexible washer secured to one of the flanges and projecting over the socket, the nose-guard and bridge-piece having portions projecting into the socket beneath the washer, and a screw having its head provided with inner conical face $e$ passing through these parts and engaging a screw-threaded bearing in the pieces, substantially as described.

In testimony whereof I affix my signature in presence of two witnesses.

PAUL MOEWS.

Witnesses:
HAZEL THOMSON,
HERMAN HINZE.